(12) United States Patent
Kang

(10) Patent No.: US 11,752,946 B2
(45) Date of Patent: Sep. 12, 2023

(54) AUTOMOTIVE HOLDER FOR FIXING BICYCLES AND ROOFTOP TENTS

(71) Applicant: Jeong Suk Kang, Suwon-si (KR)

(72) Inventor: Jeong Suk Kang, Suwon-si (KR)

( * ) Notice: Subject to any disclaimer, the term of this patent is extended or adjusted under 35 U.S.C. 154(b) by 0 days.

(21) Appl. No.: 17/747,260

(22) Filed: May 18, 2022

(65) Prior Publication Data

US 2023/0125670 A1 Apr. 27, 2023

(30) Foreign Application Priority Data

Oct. 21, 2021 (KR) .................. 10-2021-0140696

(51) Int. Cl.
| | | |
|---|---|---|
| *B60R 9/058* | (2006.01) | |
| *B60R 9/045* | (2006.01) | |
| *B60R 9/10* | (2006.01) | |

(52) U.S. Cl.
CPC .............. *B60R 9/058* (2013.01); *B60R 9/045* (2013.01); *B60R 9/10* (2013.01)

(58) Field of Classification Search
CPC ............ B60R 9/058; B60R 9/045; B60R 9/10
USPC ....................................................... 224/321
See application file for complete search history.

(56) References Cited

U.S. PATENT DOCUMENTS

| | | | | |
|---|---|---|---|---|
| 6,428,263 B1* | 8/2002 | Schellens | ................ | B60R 9/042 224/310 |
| 6,854,627 B2* | 2/2005 | Foo | ........................ | B60R 9/042 224/310 |
| 8,123,270 B2* | 2/2012 | Baccelli | .................... | B60J 7/165 296/217 |
| 8,640,933 B1* | 2/2014 | McCray | .................... | B60R 9/042 224/325 |
| 8,646,667 B2* | 2/2014 | Wang | ...................... | B60R 9/042 224/310 |
| 2002/0014504 A1* | 2/2002 | Hetu | ....................... | B60R 9/042 224/310 |
| 2004/0052622 A1* | 3/2004 | Chisnall | .................... | B60P 3/40 224/310 |
| 2004/0118884 A1* | 6/2004 | Ford | ........................ | B60R 9/10 224/325 |
| 2004/0124221 A1* | 7/2004 | Stadler | .................... | B60R 9/042 224/310 |
| 2012/0074187 A1* | 3/2012 | Gobart | .................... | B60R 9/045 224/321 |
| 2013/0112724 A1* | 5/2013 | Polewarczyk | ........... | B60R 9/045 224/321 |
| 2013/0248567 A1* | 9/2013 | Townsend | ............... | B60R 9/045 224/321 |
| 2015/0053732 A1* | 2/2015 | Wang | ....................... | B60R 9/08 224/318 |

FOREIGN PATENT DOCUMENTS

| | | |
|---|---|---|
| KR | 20-0468983 | 9/2013 |
| KR | 10-2032301 | 10/2019 |
| KR | 10-2193275 | 12/2020 |

* cited by examiner

*Primary Examiner* — Peter N Helvey
(74) *Attorney, Agent, or Firm* — LEX IP MEISTER, PLLC

(57) ABSTRACT

Proposed is an automotive holder for fixing a bicycle and a rooftop tent, the automotive holder enabling a rooftop tent to be installed in a folded state and being able to hold a bicycle in an unfolded state at a predetermined angle.

7 Claims, 6 Drawing Sheets

AUTOMOTIVE HOLDER FOR FIXING BICYCLES AND ROOFTOP TENTS

CROSS REFERENCE TO RELATED APPLICATION

The present application claims priority to Korean Patent Application No. 10-2021-0140696, filed Oct. 21, 2021, the entire contents of which is incorporated herein for all purposes by this reference.

BACKGROUND OF THE INVENTION

Field of the Invention

The present disclosure relates to an automotive holder for fixing a bicycle and a rooftop tent and, more particularly, to an automotive holder for fixing a bicycle and a rooftop tent, the automotive holder being able to fix a rooftop tent in a folded state and to hold a bicycle in an unfolded state.

Description of the Related Art

In general, tents are frequently used for outdoor leisure activities over weekend or holidays. It takes a long time to make the ground even, set poles, etc. in order to set up a tent, so rooftop tents that can be immediately used when unfolded are frequently used on the rooftop of a vehicle.

Cycling is representative as another leisure activity and bicycles are frequently used in normal life, but more people move and enjoy cycling along riding courses, getting out of the daily life in the city. As the bicycle, a mountain bike, a road bike, etc. are usually used and are mounted and carried on a vehicle in many cases.

In relation to this subject, the applicant has filed and registered an application of a "Roof top tent stands" that can be fixed and used on the rooftop of a vehicle (Korean Patent No. 10-2032301 (2019 Aug. 8)).

The prior art, as shown in FIG. 1, relates to a stand that is coupled to roof rails R of a vehicle to fix a rooftop tent on top, and the stand is composed of: several transverse bars 10 each having both ends fixed on the roof rails R; longitudinal bars 20 coupled by couplers 21 mounted on the transverse bars 10 and connecting the transverse bars 10; and transverse extension bars 30 coupled to both ends of the transverse bars 10 through hinges H.

The transverse extension bars 30 are rotated upward and folded on the transverse bars 10 to be stowed when not used, the transverse bars 10 each have a pair of coupler seats 11 recessed downward to seat the couplers 21, and the couplers 21 include end couplers 21a coupled to the coupler seats 11 of transverse bars 10 at both ends on the roof rail R, and a center coupler 21b coupled to the coupler seat 11 of a transverse bar 10 disposed at the center of the roof rails R.

The coupler has a longitudinal bar-fitting hole 21a' famed to fit and fix the longitudinal bar 20 and a pair of seat fixing portions 21b' extending downward and surrounding front and rear lower ends of the coupler seat 11.

However, according to the prior art, since the stand can be disassembled to be stowed when a rooftop tent is not used, there is an advantage in terms of fuel efficiency and management, but there is a problem that a bicycle cannot be held.

SUMMARY OF THE INVENTION

The present disclosure has been made in an effort to solve the problems of the related art and an objective of the present disclosure is to provide an automotive holder for fixing a bicycle and a rooftop tent, the automotive holder being configured to be coupled to the roof of a vehicle and having spring hinges at the front potion and a folding portion that is rotated up and down by elasticity of the spring hinges, thereby being able to hold a rooftop tent when the folding portion is folded and to hold a bicycle when the folding portion is unfolded at a predetermined angle.

In order to achieve the objectives, an automotive holder for fixing a bicycle and a rooftop tent is configured to be coupled to a pair of roof rails R extending forward and rearward at both sides on the roof or a vehicle. The automotive holder includes: a pair of rail coupling members each having a rail coupling groove on a bottom thereof to be coupled to a front portion and a rear portion of each of the roof rails, respectively; a front fixing member extending forward with a rear outer side fixed to an inner side of the rail coupling member coupled to the front portion of each of the roof rails; a main frame extending rearward with a front outer side thereof coupled to a front inner side of the front fixing member by a U-shaped spring hinge; a rear fixing member extending rearward with a front inner side thereof coupled to the inner side of the rail coupling member coupled to the rear portion of each of the roof rails; a first support hinged to a rear inner side of the rear fixing member and extending forward; and a second support hinged to a front outer side of the first support, extending rearward, and having a rear inner side to which a rear outer side of the main frame is coupled.

The spring hinge may have a fixing rotation shaft that couples the main frame to the front fixing member such that the front fixing member can rotate, and a separable transmission shaft transmitting elasticity of the fixing rotation shaft to a lower portion of the main frame to rotate around the fixing rotation shaft.

The main frame may include a front main frame coupled to the front fixing member and a rear extension frame inserted in the front main frame and extending forward and rearward.

An oblong wheel insertion hole may be formed vertically through the front main frame such that a lower end portion of a rear wheel of a bicycle protrudes downward when the rear wheel is inserted therein.

A support seat recessed inward may be formed on an outer side of the rear extension frame to be seated on the first support while surrounding an inner side of the second support in a folded state.

A rail reinforcement beam transversely extending between the roof rails may be disposed at lower ends of the rail coupling members.

A frame reinforcement plate connecting the front and rear portions of the main frames may be disposed on tops of the main frames between the main frames, and a plurality of holes may be formed vertically through the frame reinforcement plates so that a Velcro tape or a fixing rope is easily fastened.

A frame reinforcement beam transversely extending may be disposed on the main frames to connect the main frames.

The automotive holder for fixing a bicycle and a rooftop tent according to the present disclosure has the following effects.

First, since the oblong wheel insertion hole in which the rear wheel of a vehicle is inserted is formed through the top of the main frame, it is possible to mount a rooftop tent in a folded state and to mount a bicycle in an unfolded state at a predetermined angle, and the automotive holder can be used as a tent support in a fully unfolded state.

Second, since the rail coupling grooves are formed at the rail coupling members that are coupled to roof rails of a vehicle, the automotive holder can be easily installed on and separated from the roof rails.

Third, since elasticity is transmitted when the spring hinges are coupled and released so that the main frames are rotated up and down, the automotive holder can be easily folded and unfolded, so quick conversion is possible for use.

Fourth, since the rail reinforcement beam connecting the rail coupling members, and the frame reinforcement beam and the frame reinforcement plate that connect the main frames are provided, it is possible to more firmly fix a rooftop tent and a bicycle that are mounted on the automotive holder.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION OF THE INVENTION

Hereinafter, an embodiment of the present disclosure will be described in detail with reference to the accompanying drawings.

Figure 1:
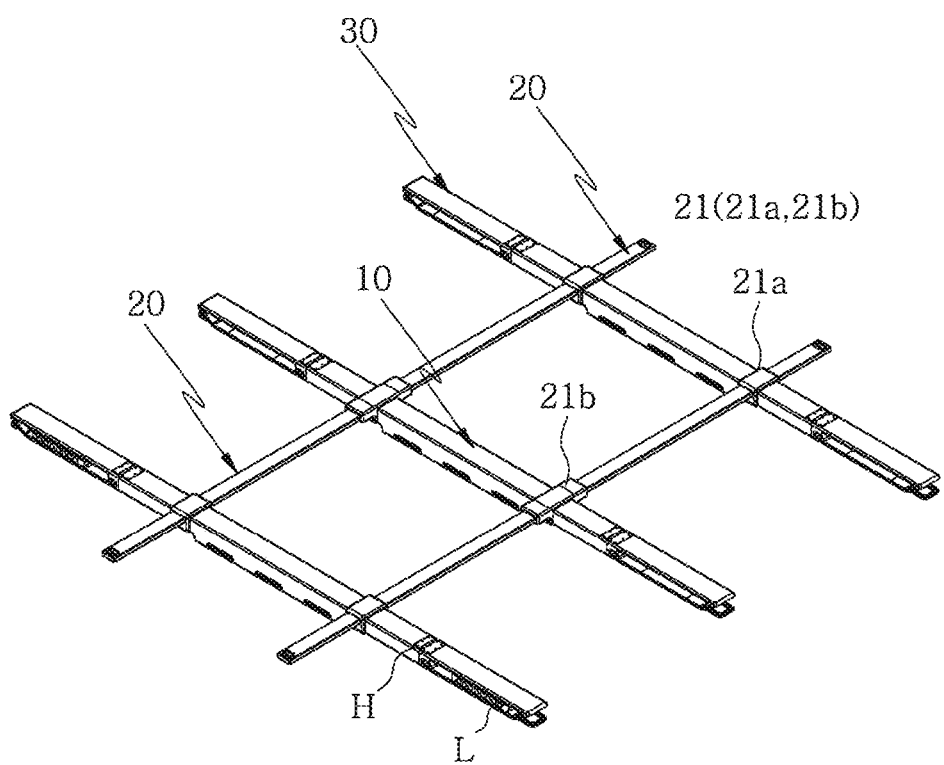
FIG. 1 is a view showing a rooftop tent stand according to the related art.
Figure 2:
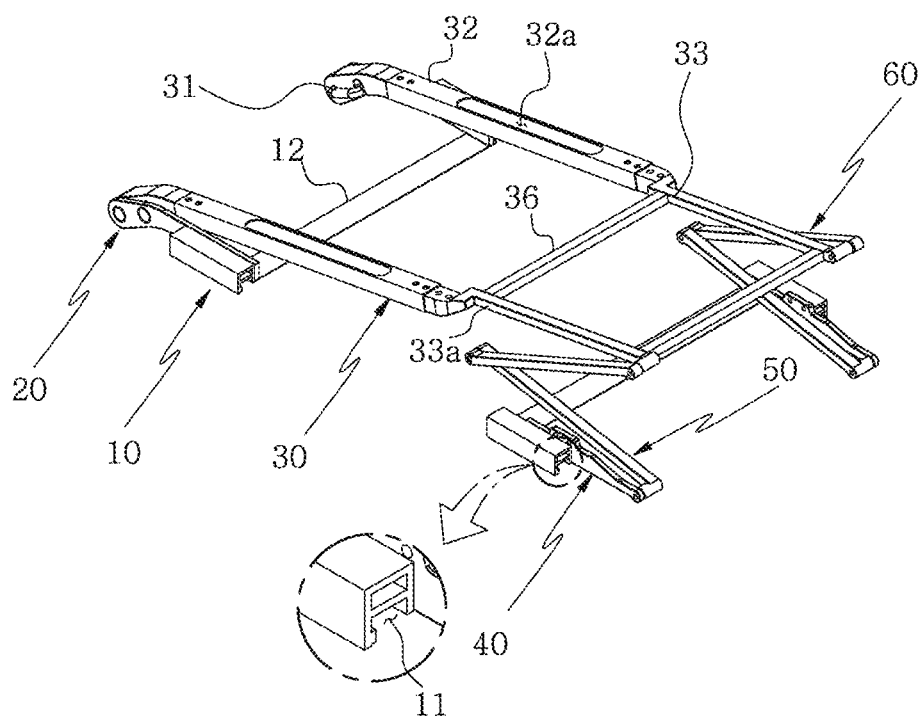
FIG. 2 is a view showing an unfolded state of an automotive holder for fixing a bicycle and a rooftop tent according to the present disclosure.
Figure 3:
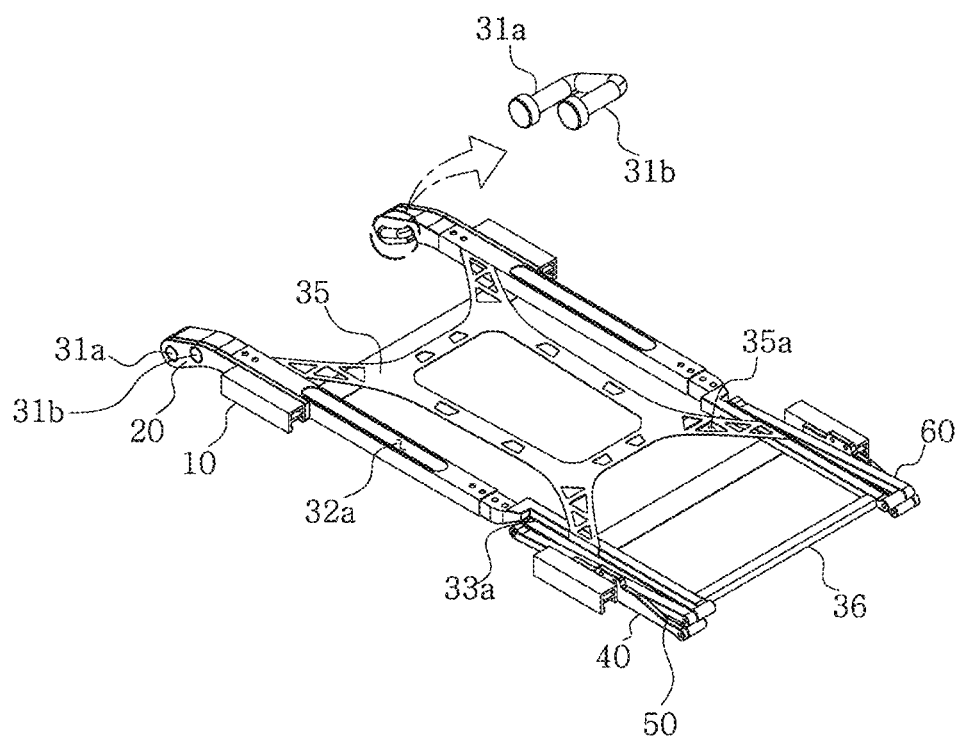
FIG. 3 is a view showing a folded state of the automotive holder for fixing a bicycle and a rooftop tent in accordance with another embodiment of the present disclosure.
Figure 4:
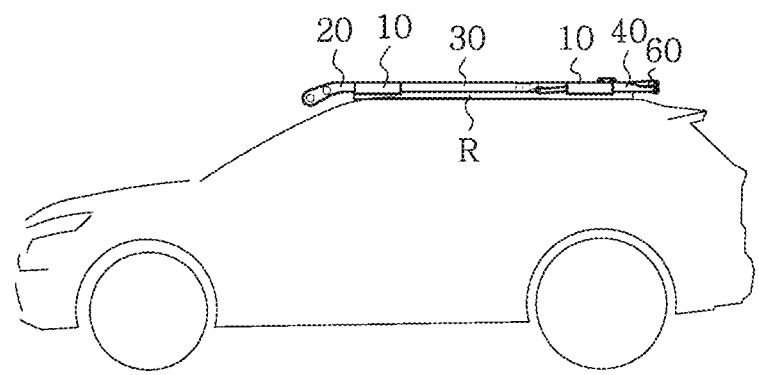
FIG. 4 is a view the state when the automotive holder for fixing a bicycle and a rooftop tent according to the present disclosure is installed on the rooftop of a vehicle.
Figure 5:
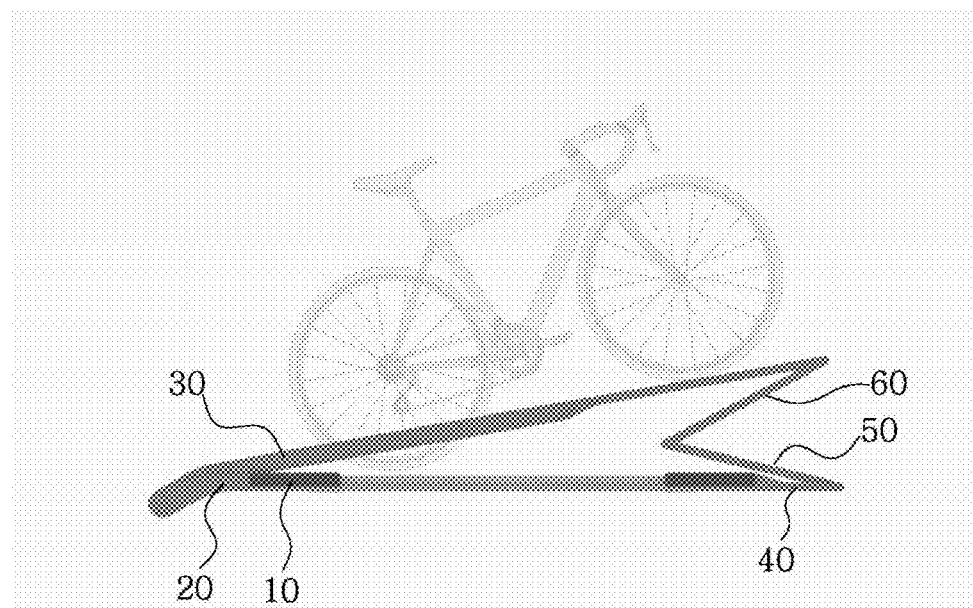
FIG. 5 is a view showing the state when a bicycle is mounted on the automotive holder according to the present disclosure.
Figure 6:
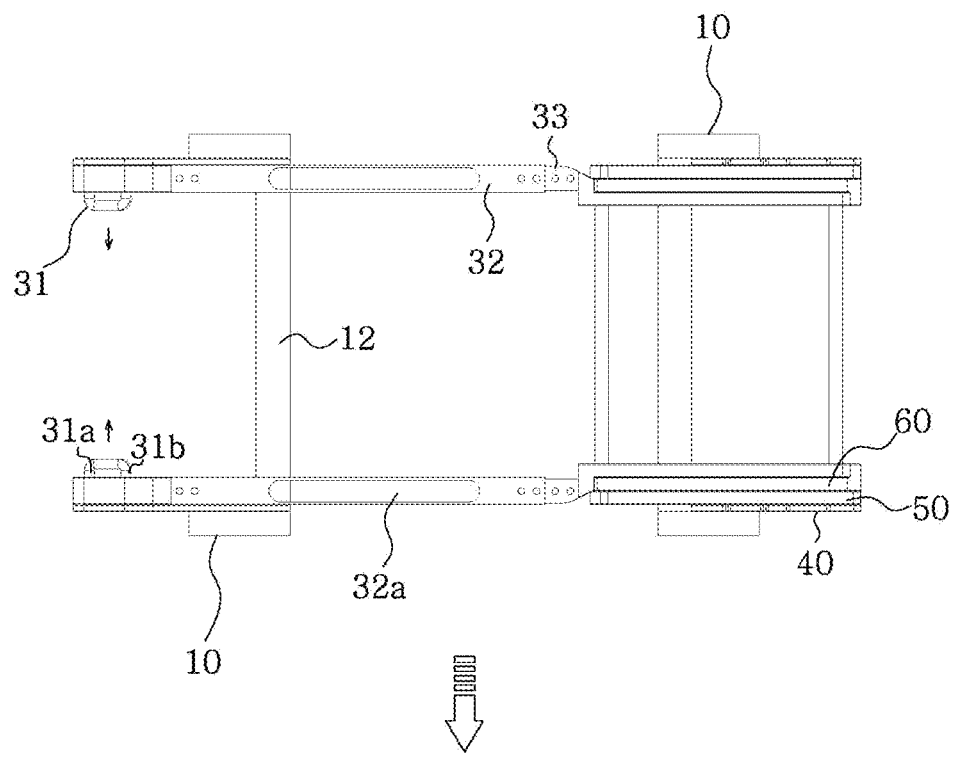
FIG. 6 is a view showing the state when spring hinges of the automotive holder according to the present disclosure are operated.
Figure 6:
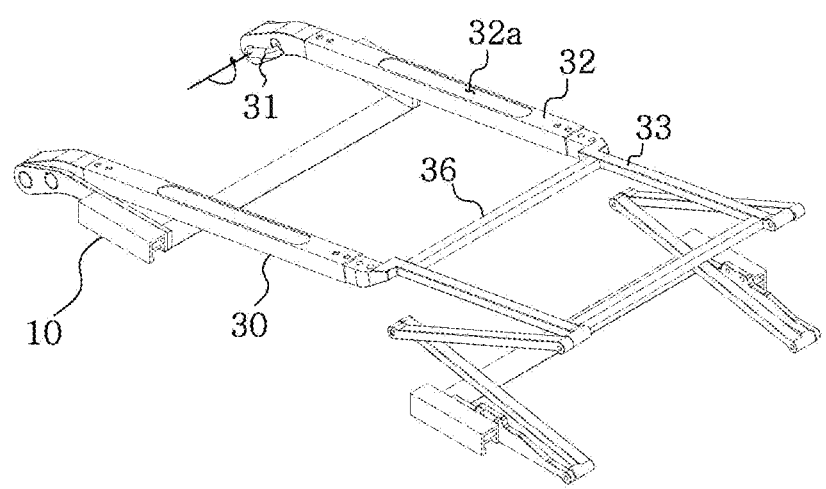

An automotive holder for fixing a bicycle and a rooftop tent according to the present disclosure is, as shown in FIGS. 2 to 6, configured to be coupled to a pair of roof rails R extending forward and rearward on both sides of the roof of a vehicle. The automotive holder for fixing a bicycle and a rooftop tent includes: a pair of rail coupling members 10 each having a rail coupling groove 11 on the bottom to be coupled to a front portion and a rear portion of each of the roof rails R, respectively; a front fixing member 20 extending forward with a rear outer side fixed to the inner side of the rail coupling member 10 coupled to the front portion of each of the roof rails R; a main frame 30 extending rearward with a front outer side coupled to a front inner side of the front fixing member 20 by a U-shaped spring hinge 31; a rear fixing member 40 extending rearward with a front inner side coupled to the inner side of the rail coupling member 10 coupled to the rear portion of each of the roof rails R; a first support 50 hinged to the rear inner side of the rear fixing member 40 and extending forward; and a second support 60 hinged to the front outer side of the first support 50, extending rearward, and having a rear inner side to which the rear outer side of the main frame 30 is coupled.

In this configuration, the terms 'front (forward)' and 'rear (rearward)' are determined under the assumption that a front seat corresponds to the front and a backseat corresponds to the rear.

The rail coupling members 10 are coupled to the front portion and the rear portion of each of the roof rails R, respectively, through the rail coupling grooves 11, so a total of four rail coupling members 10 are coupled to a pair of roof rails R.

The front of the main frame 30 is coupled to the front fixing member 20 by the spring hinge 31 and the rear of the main frame 30 is hinged to the second support 60.

The spring hinge 31 has a fixing rotation shaft 31a that couples the main frame 30 to the front fixing member 20 such that the front fixing member 20 can rotate, and a separable transmission shaft 31b transmitting elasticity of the fixing rotation shaft 31a to the lower portion of the main frame to rotate around the fixing rotation shaft 31a. Accordingly, when the separable transmission shaft 31b is separated, the elasticity of the fixing rotation shaft 31a is transmitted to the separable transmission shaft 31b and the separable transmission shaft 31b comes in close contact with the lower portion of the main frame 3, whereby the rear of the main frame 3 is rotated up at a predetermined angle.

The main frame 30 is composed of a front main frame 32 coupled to the front fixing member 20 and a rear extension frame 33 inserted in the front main frame 32 and extending forward and rearward, so elasticity of the fixing rotation shaft 31a can be easily transmitted.

An oblong wheel insertion hole 32a is formed vertically through the front main frame 32 such that the lower end portion of the rear wheel of a bicycle protrudes downward when the rear wheel is inserted, so the bicycle can be stably held. The bicycles may be held with the front wheel separated, depending on the kinds of bicycles, and it is possible to more firmly fix a bicycle by fixing the bicycle to the main frame 30 with a Velcro tape, etc., depending on the states of roads.

A support seat 33a recessed inward is formed on the outer side of the rear extension frame 33 to be seated on the first support 50 while surrounding the inner side of the second support 60 in a folded state, so the top of the rear extension frame 33 and the top of the second support 60 that are positioned at the rear portion of the roof rail R when the holder is folded are leveled.

A rail reinforcement beam 12 transversely extending between the roof rails R is disposed at the lower ends of the rail coupling members 10, that is, the rail reinforcement beam 12 is integrated with the rail coupling member 10 while extending between the roof rails R disposed at both sides on the roof of a vehicle.

A frame reinforcement plate 35 connecting the front and rear portions of the main frames 30 is disposed on the tops of the main frames 30 between the main frames 30 and a plurality of holes 35a is formed vertically through the frame reinforcement plates 35 so that a Velcro tape or a fixing rope can be easily fastened, whereby a rooftop tent is more firmly fixed with the bottom strongly supported.

A frame reinforcement beam 36 transversely extending is disposed on the main frames 30 to connect the main frames 30.

The operation of the automotive holder for fixing a bicycle and a rooftop tent having the above configuration according to the above configuration is described hereafter.

According to the automotive holder for fixing a bicycle and a rooftop tent of the present disclosure, the top of the main frame 30 are flat in the folded state, so a rooftop tent can be easily held. Further, the rear wheel of a bicycle is inserted in the oblong wheel insertion hole 32*a* of the main frame 30 in an unformed state at a predetermined angle, so the bicycle can be easily fixed. In this case, a separate Velcro tape or a fixing rope may be used to increase the force that fixing the main frame 30 and the rear wheel of a bicycle, depending on the states of roads, thereby being able to reinforce coupling.

The main frame 30 is coupled and fixed to the front fixing member 20 by the spring hinge 31, and when the separable transmission shaft 31*b* of the spring hinge 31 is released, the spring hinge 31 generates elasticity for rotating around the fixing rotation shaft 31*a*. The elasticity of the spring hinge 31 is transmitted to the bottom of the main frame 30 through the separable transmission shaft 31*b*, so the rear of the main frame 30 is lifted up, whereby a bicycle can be easily held.

The frame reinforcement plate 35 additionally coupled to the top of the main frame 30 is a component for supporting the bottom of a rooftop tent in a folded state and has the plurality of coupling holes 35*a*, so a rooftop tent can be more firmly fixed.

Further, according to the present disclosure, since the rail coupling hole 11 is famed at the rail coupling member 10, the rail coupling member 10 is fitted on the roof rail R, so the holder can be easily installed or separated.

The rail reinforcement beam 12 coupled to the lower end of the rail coupling members 10 and the frame reinforcement beam 36 connecting the inner sides of the main frames 30 can more firmly support the main frames 30 through the rail coupling members 10 coupled to the roof rails R at both sides.

Since the main frame 30 has the front main frame 32 and the rear main frame 33, the main frame 30 can be more smoothly moved up and down.

As described above, the automotive holder of the present disclosure can be easily installed, and it is possible to more quickly set a rooftop tent and a bicycle by changing the angles of the main frames 30 using the spring hinges 31.

The present disclosure is not limited to the specific embodiments and may be modified in various ways without departing from the scope of the present disclosure described in claims by those skilled in the art, and the modifications are included in the scope of the present disclosure.

What is claimed is:

1. An automotive holder for fixing a bicycle and a rooftop tent, the automotive holder configured to be coupled to a pair of roof rails R extending forward and rearward at both sides on the roof or a vehicle, and comprising:
    a pair of rail coupling members each having a rail coupling groove on a bottom thereof to be coupled to a front portion and a rear portion of each of the roof rails, respectively;
    a front fixing member extending forward with a rear outer side fixed to an inner side of the rail coupling member coupled to the front portion of each of the roof rails;
    a main frame extending rearward with a front outer side thereof coupled to a front inner side of the front fixing member by a U-shaped spring hinge;
    a rear fixing member extending rearward with a front inner side thereof coupled to the inner side of the rail coupling member coupled to the rear portion of each of the roof rails;
    a first support hinged to a rear inner side of the rear fixing member and extending forward; and
    a second support hinged to a front outer side of the first support, extending rearward, and having a rear inner side to which a rear outer side of the main frame is coupled,
    wherein the spring hinge has a fixing rotation shaft that couples the main frame to the front fixing member such that the front fixing member can rotate, and a separable transmission shaft transmitting elasticity of the fixing rotation shaft to a lower portion of the main frame to rotate around the fixing rotation shaft.

2. The automotive holder of claim 1, wherein the main frame includes a front main frame coupled to the front fixing member and a rear extension frame inserted in the front main frame and extending forward and rearward.

3. The automotive holder of claim 2, wherein an oblong wheel insertion hole is formed vertically through the front main frame such that a lower end portion of a rear wheel of a bicycle protrudes downward when the rear wheel is inserted therein.

4. The automotive holder of claim 2, wherein a support seat recessed inward is formed on an outer side of the rear extension frame to be seated on the first support while surrounding an inner side of the second support in a folded state.

5. The automotive holder of claim 1, wherein a rail reinforcement beam transversely extending between the roof rails is disposed at lower ends of the rail coupling members.

6. The automotive holder of claim 5, wherein a frame reinforcement plate connecting the front and rear portions of the main frames is disposed on tops of the main frames between the main frames, and
    a plurality of holes is famed vertically through the frame reinforcement plates so that a Velcro tape or a fixing rope is easily fastened.

7. The automotive holder of claim 1, wherein a frame reinforcement beam transversely extending is disposed on the main frames to connect the main frames.

* * * * *